US006236315B1

(12) United States Patent
Helms et al.

(10) Patent No.: US 6,236,315 B1
(45) Date of Patent: May 22, 2001

(54) METHOD AND APPARATUS FOR IMPROVING THE INTERROGATION RANGE OF AN RF TAG

(75) Inventors: Howard David Helms, Brookside; Alex Pidwerbetsky, Randolph, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/421,867

(22) Filed: Oct. 19, 1999

(51) Int. Cl.[7] .................................................. G08B 13/14
(52) U.S. Cl. .................... 340/572.7; 340/825.54; 340/505; 340/573.1; 340/928; 343/895; 343/866; 343/720
(58) Field of Search ............................ 340/572.7, 825.54, 340/572.1, 505, 573.1, 928; 343/895, 866, 720

(56) References Cited

U.S. PATENT DOCUMENTS 3,703,723  11/1972  Albanese et al. ........................ 342/6
5,649,296  * 7/1997  MacLellan et al. ................ 455/38.2
5,842,118  * 11/1998  Wood, Jr. .............................. 455/101

* cited by examiner

Primary Examiner—Jeffrey Hofsass
Assistant Examiner—Tai T. Nguyen (57) ABSTRACT

A method for increasing the interrogation range of an RF Tag in a radio communication system using RF Tags with two reflecting antenna elements. The second reflecting antenna element is predeterminately positioned, and preferably aligned, with respect to the first reflecting antenna element in the direction of expected incident RF radiation and is spaced from the first reflecting antenna element at a predetermined fixed distance. The first and second reflecting antenna elements are alternately pulsed on and off such that while the first reflecting antenna element is in a signal reflecting operating state, the second reflecting antenna element is in a substantially non-reflecting state and vice versa. The alternate pulsing and predetermined fixed spacing between the first and second elements generates a known phase difference between the reflected signals of the first and second reflecting antenna elements. The phase difference is preferably 180 degrees which may be achieved by spacing the second reflecting antenna element from the first reflecting antenna element at a distance equivalent to ¼ of the wavelength of the interrogating signals.

31 Claims, 8 Drawing Sheets

METHOD AND APPARATUS FOR IMPROVING THE INTERROGATION RANGE OF AN RF TAG

BACKGROUND OF THE INVENTION

1. Field of the Invention

The present invention relates to wireless communication systems and, more particularly, wireless communication systems using backscatter technology.

2. Description of the Related Art

RF Tag systems are radio communication systems that communicate between a radio transceiver, called an Interrogator, and a number of inexpensive devices denoted as Tags. In RF Tag systems, the Interrogator communicates to the Tags using modulated radio signals which activate any Tag in range or may activate a specific Tag within the range. After activating a Tag, the Interrogator may transmit information to it (this is called the Downlink). The Interrogator transmits a Continuous-Wave (CW) radio signal to the Tag; the Tag then modulates the CW signal using modulated backscattering (MBS) in which the Tag is electrically switched by the modulating signal, from being an absorber of RF radiation to a reflector of RF radiation. This modulated backscatter allows communications from the Tag back to the Interrogator (called the Uplink). The Downlink transmission of messages can include information relating to a desired operation of the RF Tag and, for example, the Interrogator is capable of instructing the RF Tag to turn on and/or off on demand. Modulated Backscatter (MBS) systems can be used to manage inventory or perform other useful monitoring application such as reading the state of a sensor.

Figure 1:
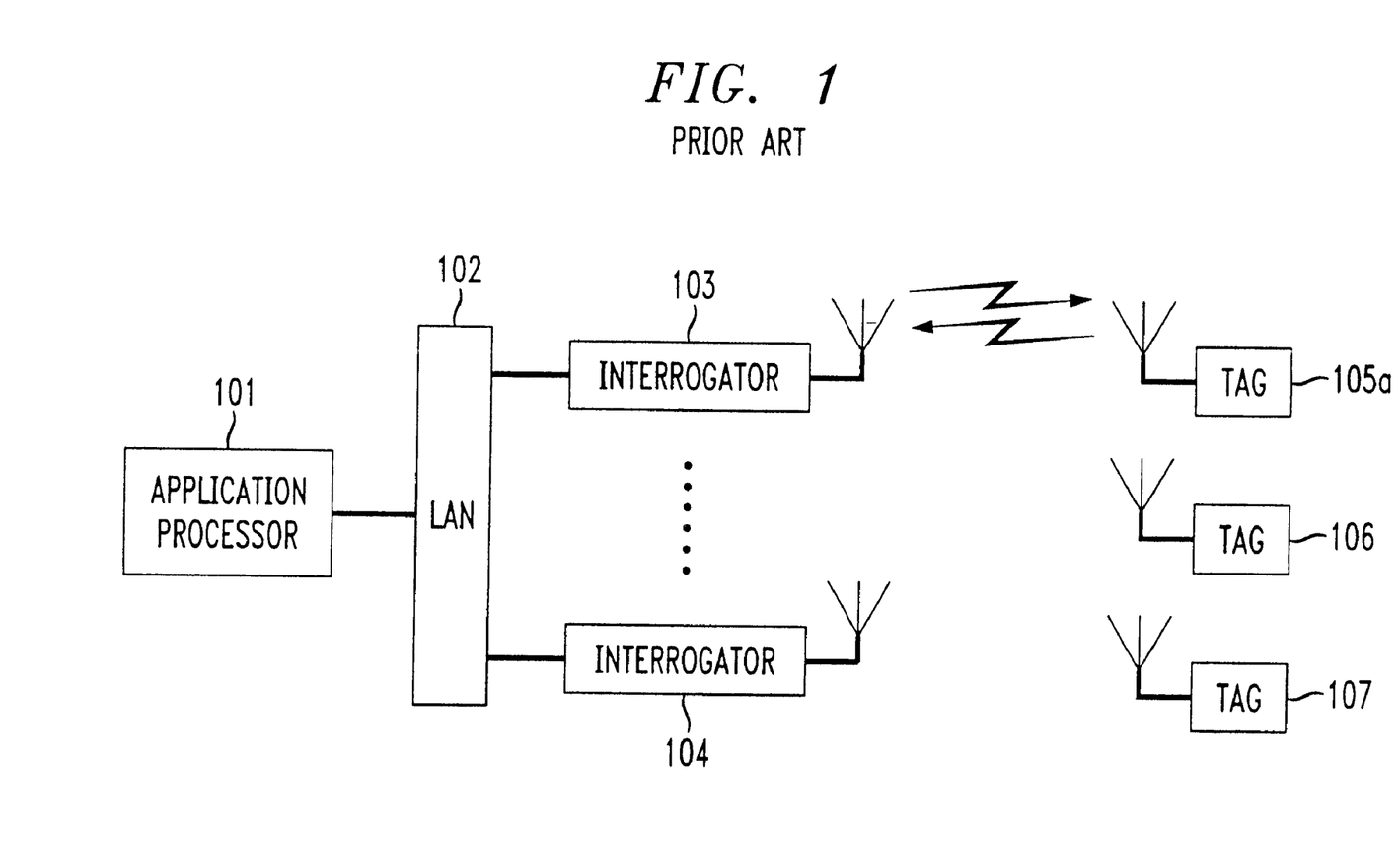
FIG. 1 is a block diagram of an illustrative prior art Radio Frequency Identification System to which the present invention is applicable.

The operation of an RF Tag system utilizing MBS is now described. In FIG. 1, there is shown an overall block diagram of an RF Tag system. An Application Processor 101 communicates over Local Area Network (LAN) 102 to a plurality of Interrogators 103–104. (Although commonly a plurality of Interrogators 103–104 connected by a LAN 102 to an Application Processor 101 are used, the inventions described herein are also capable of being configured with only a single Interrogator connected either to a LAN or directly to an Application Processor.) The Interrogators may then each communicate with one or more of the Tags 105a–107. For example and with further reference to FIG. 2, the Interrogator 103 receives an information signal, typically from Applications Processor 101. The Interrogator 103 takes this information signal and Processor 200 formats a Downlink message (Information Signal 200a) to be sent to the Tag. The information signal (200a) may include data information such as information specifying which Tag is to respond (each Tag may have fixed or programmed identification number), instructions for the Tag's processor to execute such as activation and deactivation, and/or any other information to be used and/or stored by the Tag's processor. With joint reference to FIGS. 1 and 2, Radio Signal Source 201 synthesizes a radio signal, Modulator 202 modulates the radio signal using Information Signal 200a, and Transmitter 203 transmits this modulated signal via Antenna 204, illustratively using amplitude modulation, to a Tag. Amplitude modulation is a desirable choice because the Tag can demodulate such a signal with a single, inexpensive nonlinear device (such as a diode). However, many modulation schemes are possible such for example, as Phase Shift Keying (PSK) of the subcarrier (e.g., BPSK, QPSK), more complex modulation schemes (e.g., MSK, GMSK), etc.

In the Tag 105a (see FIG. 3a), the reflecting antenna element 301a (e.g. a loop or patch antenna) receives the modulated signal. This signal is demodulated directly to baseband using the Detector/Modulator 302 which, illustratively, may be a single Schottky diode. The result of the diode detector is essentially a demodulation of the incoming signal directly to baseband. The Information Signal 200a is then amplified by Amplifier 303, and bit synchronization is recovered in Clock Recovery Circuit 304. Clock recovery circuits such as circuits that recover a clock from Manchester encoded data are well known in the art. If large amounts of data are being transferred in frames, then frame synchronization may be implemented, as for example by detecting a predetermined bit pattern that indicates the start of a frame. The bit pattern may be detected by clock recovery circuit 304 or processor 305; bit pattern detection is well known in the art. The resulting information from clock recovery circuit 304 is sent to a Processor 305. Processor 305 is typically an inexpensive 4 or 8 bit microprocessor and its associated memory, and it generates an Information Signal 306 from Tag 105a back to the Interrogator (e.g., 103). Information Signal 306 is sent to Detector/Modulator 302 to modulate the RF signal received by Tag 105a to produce a modulated backscatter (i.e. reflected) signal. A Battery 310 or other power supply provides operating power to the circuitry of Tag 10a. Power may also be received, for example, by using inductive coupling or microwaves.

Returning to FIG. 2, the Interrogator 103 receives the reflected modulated signal through Receive Antenna 206, amplifies the signal in a Low Noise Amplifier 207, and demodulates the signal using homodyne detection in a Mixer 208. In an alternative embodiment, a single antenna may replace Transmit antenna (204) and Receive Antenna (206), in which case an electronic method of canceling the transmitted signal from that received by the receiver chain is required.

Figure 2:
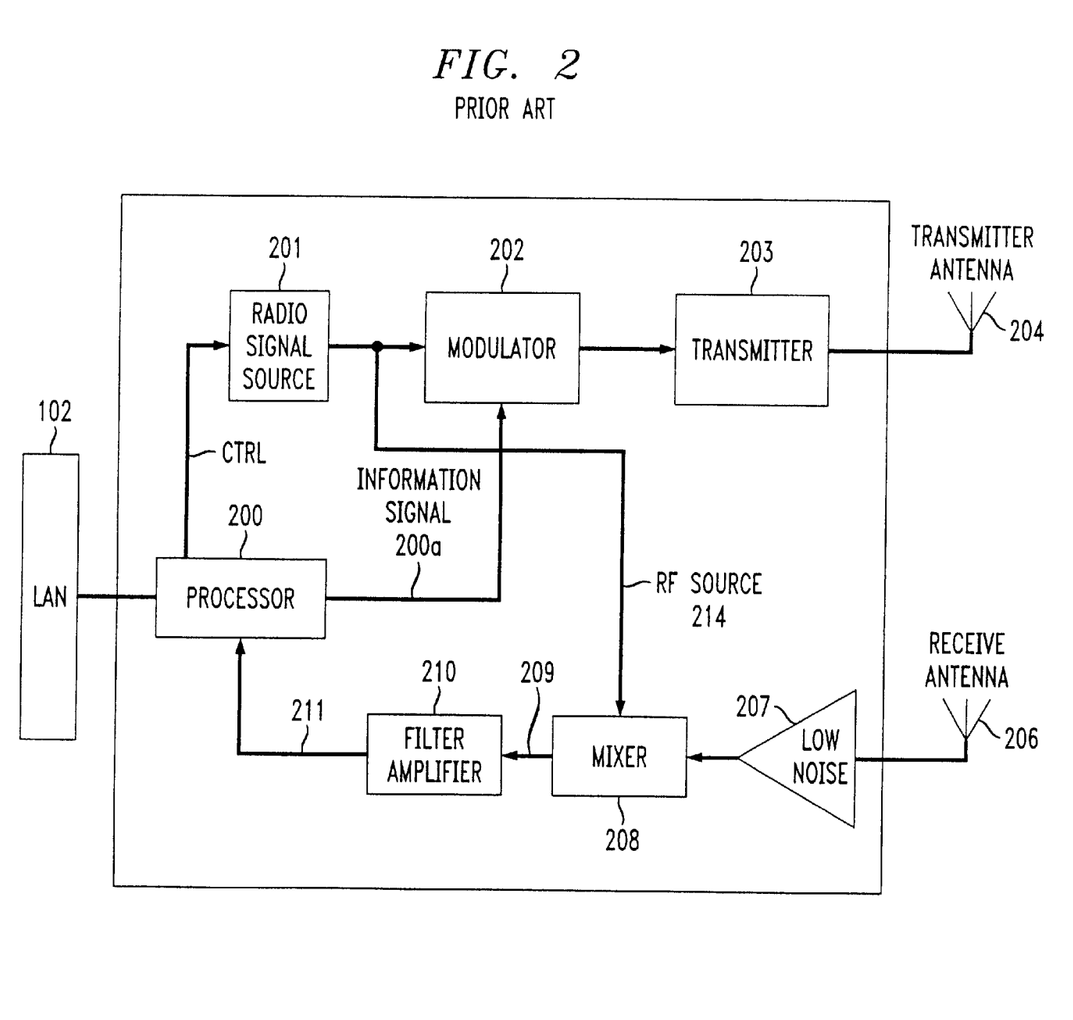
FIG. 2 is a block diagram of an illustrative prior art Interrogator used in the RF Tag system of FIG. 1.

Using the same Radio Signal Source 201 as is used in the transmit chain means that the demodulation to baseband is done using homodyne detection; this has advantages in that it greatly reduces phase noise in the receiver circuits. The Mixer 208 then sends the Demodulated Signal 209 (if Mixer 208 is a Quadrature Mixer, it would send both I (in phase) and Q (quadrature) signals) to the Filter/Amplifier 210. The resulting filtered signal—typically an Information Signal 213 is sent to a Processor 200 to determine the content of the message.

Generally, RF Tags have a single reflecting antenna. Since the Tag only reflects RF energy instead of generating it, an RF Tag is less expensive to manufacture and requires little battery power when operating. Consequently, an RF Tag provides a low cost arrangement and method of transmitting sensor measurements to a central processing system or operator for evaluation.

The advantages of using RF Tags to transmit information to an Interrogator are accompanied by a disadvantage: since the RF Tag is only a reflector, the signals returned from it are generally weaker than in systems that generate RF energy at both ends of the communications link. For example, in an RF Tag system the signal-to-noise ratio (SNR) of a signal sent from the Tag falls off rapidly (proportionally to $r^{-4}$, where r is the distance between the transmitter and reflector). By comparison, in a communication system having a transmitter at one end and a receiver at the other, the SNR in each direction falls off slowly (proportionally to $r^{-2}$). Thus, the interrogation range of the RF Tag is notably more limited by its distance from the RF transmitting source.

Figure 4:
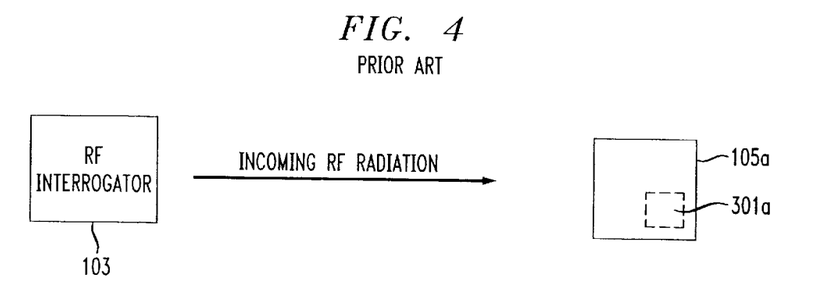
FIG. 4 is a block diagram representing a prior art reflecting antenna element (RF-Tag) system.
Figure 5:
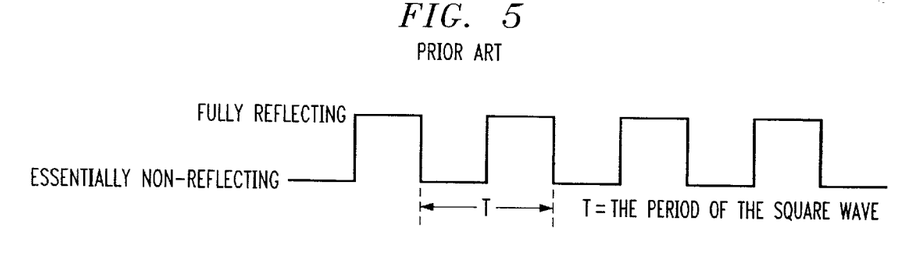
FIG. 5 is a prior art timing diagram of the reflectivity of the single reflecting antenna element of FIG. 1.

FIG. 4 depicts incoming RF radiation generated by RF Interrogator 103 and directed toward an RF Tag 105a having a reflecting antenna element 301a, and FIG. 5 shows the reflectance of the RF Tag 105a of FIG. 4. As is clear from FIG. 5, during operation the reflecting antenna 301a of RF Tag 105a is either in a fully reflecting mode or an essentially non-reflecting mode. For each fill period T of the square wave depicted in FIG. 5, reflecting antenna 301a of RF Tag 105a is only in the fully reflecting mode for half of each period T.

SUMMARY OF THE INVENTION

The invention solves the above problems by providing two antenna elements axially aligned in a direction of expected incident radiation and spaced such that the echo signal of the second reflecting antenna element is 180° out of phase with the echo signal generated by the first reflecting antenna element. This 180° phase shift can be achieved, for example, by spacing the first and second reflecting antenna elements with respect to each other by a distance approximately equal to a quarter wavelength ($\lambda/4$) of the RF interrogating signal. The first and second reflecting antenna elements are then alternately pulsed on and off such that while one reflecting antenna element is in the reflecting mode, the other reflecting antenna element is in the non-reflecting mode and vice versa. If the axis of the two antenna elements is oriented towards the Interrogator, the echoes reflected from the RF Tag will alternate by 180°, as will be shown in detail later.

In another contemplated embodiment, more than two antenna elements can be provided in the RF Tag such that pairs of the antenna elements are alternately pulsed on and off, and the pair that provides the strongest reflection will be used for the current and future interrogations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 3A:
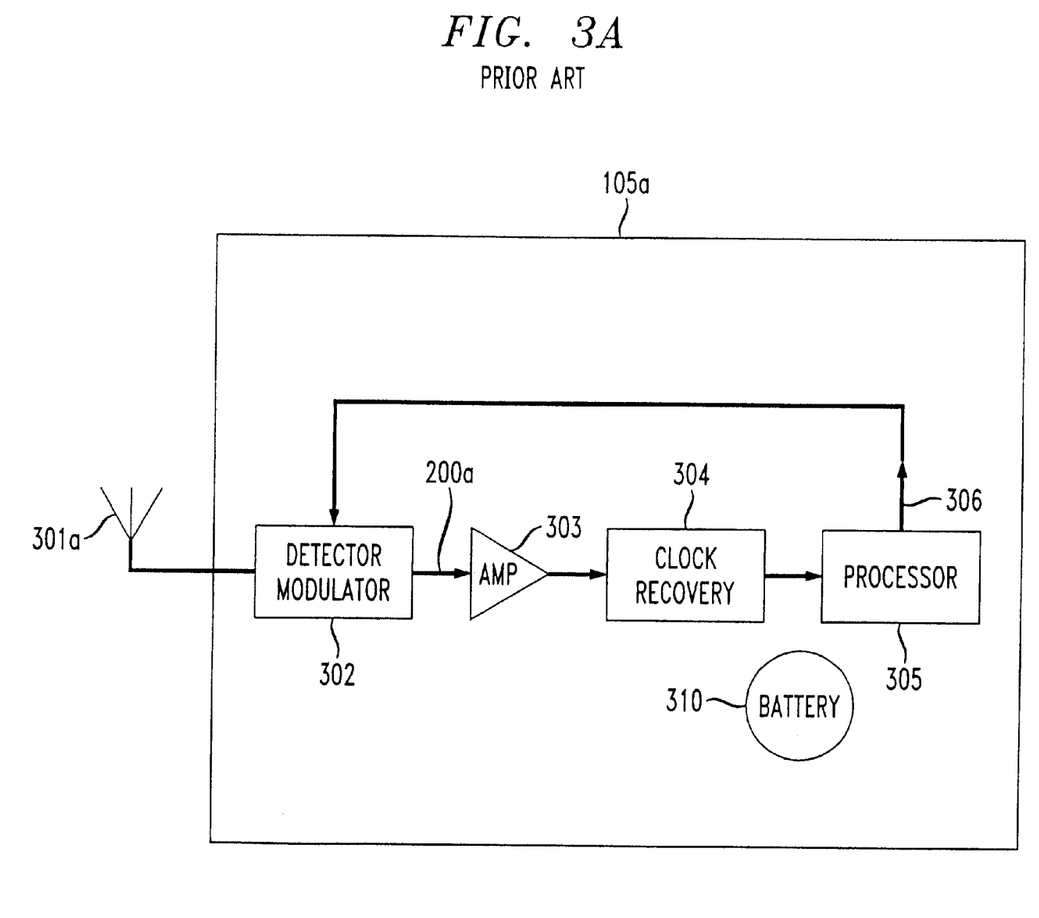
FIG. 3a is a block diagram of a prior art RF Tag used in the RFID system of FIG.
Figure 3B:
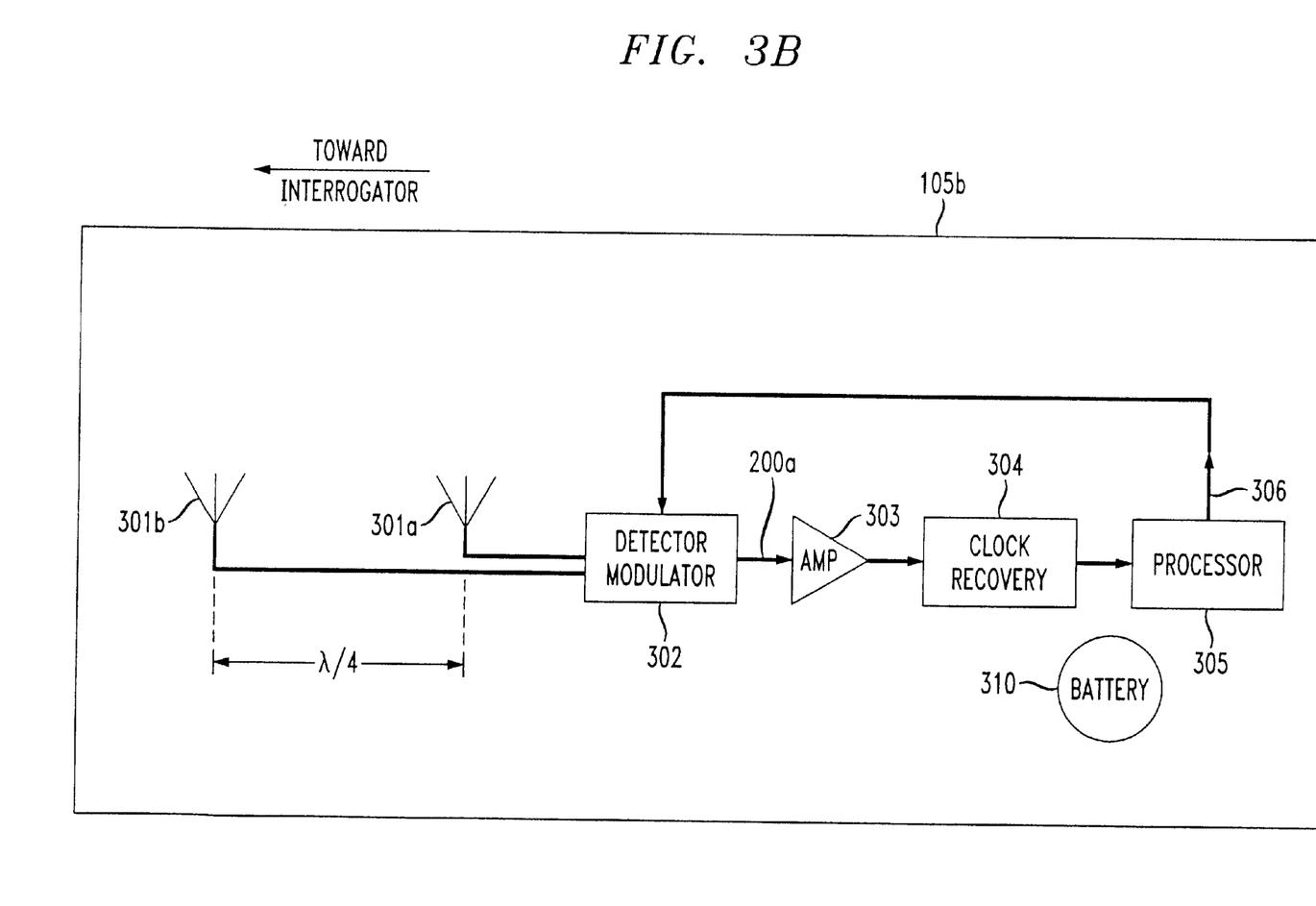
FIG. 3b is a block diagram of an RF Tag according to an embodiment of the present invention.
Figure 6A:
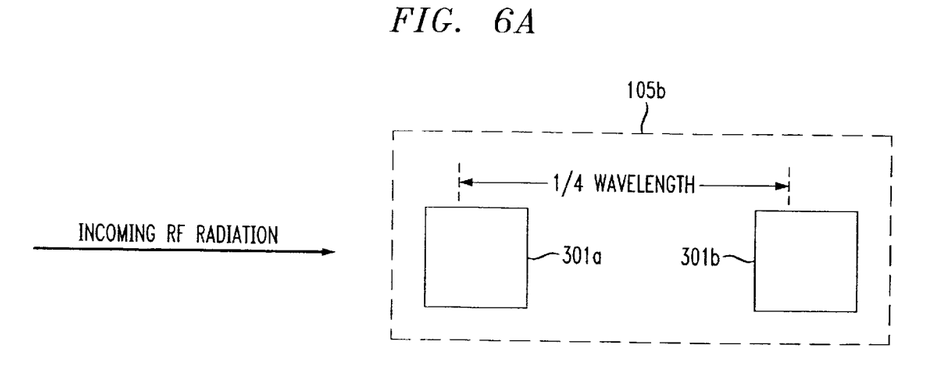
FIG. 6a is a block diagram of an RF Tag containing two reflecting antenna elements according to an embodiment of the present invention.

Referring now to FIGS. 3b and 6a, in accordance with an embodiment of the present invention an RF Tag 105b includes a first antenna (reflecting) element 301a and a second antenna (reflecting) element 301b predeterminately disposed with respect to the first reflecting element 301a such that the echo signal of second reflecting element 301b is preferably 180° out of phase with the echo signal generated by first reflecting element 301a This phase relationship can be achieved by positioning the second reflecting element 301b ¼ wavelength ($\lambda/4$) from the first reflecting element 301a and then orienting the RF Tag so the axis of the two reflecting elements points towards the Interrogator. The axial alignment of the two reflecting elements in the direction of the expected incident radiation (i.e., the direction from which the Interrogator interrogates the RF Tag) is required to achieve the 180° phase relationship and therefore a constructive interference. When the axial alignment of the two antenna elements is changed for any reason resulting in a change in the phase relationship of the respective echo signals is reduced to less than 60°, the desired constructive interference becomes destructive and the performance gain is lost.

According to an embodiment of the present invention, the amount of phase difference between the echo signal of the second reflecting element 301b and the first reflecting element 301a can be in a range of 60°–180°. The preferred 180° out-of phase relationship between the two reflecting elements 301a and 301b can be obtained, for example, by positioning one reflecting element approximately ¼ wavelength (of the interrogating signal) in front of the other in the direction from which the incident RF transmission is expected to arrive. Those of ordinary skill in the art will of course quickly recognize that this ¼ spacing is only one exemplary arrangement among many geometries that can be used to achieve the desired phase relationship between the two reflected signals. For example, spacings of ¾$\lambda$, ⅝$\lambda$, ⅞$\lambda$ can also achieve the 180° out-of-phase relationship.

The two reflecting elements 301a and 301b (or sets of reflecting elements) are alternately pulsed on and off such that first reflecting element 301a enters a reflecting state when second reflecting element 301b enters a non-reflecting state, and vice versa. Care must be taken that both reflectors 301a and 301b are not simultaneously active because when both reflectors 301a and 301b are simultaneously active, and if both reflections are equally strong, the two reflected signals cancel each other out and provide no improvement in the interrogation range.

In the preferred embodiment, the alternate pulsing of reflecting elements 301a and 301b is activated by processor 305 as instructed by the RF Interrogator in its initial transmission to the reflecting elements 301a and 301b. A bit stream of information containing coded instructions for the RF Tags is sent to RF Tag 105b such that the processor 305 recognizes that it has being interrogated (e.g., by recognizing its ID code). As explained with reference to FIG. 1, the initial transmission of the Interrogator can provide control information to the RF Tags and, more particularly, enables the selective activation and deactivation thereof. After receiving any instructions from the Interrogator, the processor 305 places the RF Tag into its data read out mode. According to the present invention, processor 305 accomplishes this by switching the reflectivities of the reflector elements 301a and 301b alternately. The processor 305 can accomplish this by setting the control lead to reflecting element 301a to a logic one while setting the control lead of reflecting element 301b to logic zero, and vice versa.

In an alternative embodiment, processor 305 can be pre-programmed to generate a square wave that is capable of alternately pulsing on and off the respective first and second reflecting antenna elements 301a and 301b. In this embodiment, the RF tag 105b will usually be turned off, and upon receipt of the initial interrogating RF signal will be turned on. Once activated (i.e., turned on), the pre-programmed square wave will automatically generate the desired alternate pulsing of the reflecting antenna elements.

Once the alternate pulsing of the pair of reflecting antenna elements is established, the continuous wave (CW) transmission begins to cause RF Tag 105b to reflect information relating to the data set or data measurements stored in or sensed by the RF Tag. The alternate pulsing of reflecting elements 301a and 301b changes the phase of the reflected signal by 180° because the incident signal traverses a round-trip path that is a total of one-half a wavelength longer (i.e. twice the ¼ spacing of the reflecting elements) than that of single reflector prior art systems. The change in phase of the reflected signal results in a 6 dB improvement in the signal-to-noise ratio (SNR) as compared with the single reflecting element configuration of FIG. 1, as shown in the mathematical analysis presented later. The 6 dB improvement can be achieved when the two reflecting elements 10 and 12 are spaced approximately ¼ wavelength apart and reflect equally strongly in the direction of reflection. If this is not the case, an improvement that is less than a 6 dB will be achieved until the spacing becomes less than ¹⁄₁₂ in the direction of the incident signal, which would result in a configuration whose performance is worse than that of the single reflector of the prior art.

In accordance with the preferred embodiment, reflecting elements 301a and 301b depicted in FIG. 6a are disposed on the same Tag. Accordingly the reflecting elements 301a, 301b and 301c, and 301a, 301b, 310c and 301d of FIGS. 6b and 6c, respectively, are embodied on the same Tag. It is contemplated herein to include the added reflecting elements for increasing the interrogation range of the RF Tag separately from the RF Tag such that they can be added to an existing RF Tag without requiring modification of the same. In this embodiment, the added reflecting elements are also disposed in spaced relation with the single reflecting element of the RF Tag such that they are ¼ apart in the direction of the expected incident radiation so as to achieve the desired 180° phase shift in reflected signals. As discussed, one of ordinary skill will quickly recognize that other embodiments can be included that achieve the same 180° phase shift without necessarily requiring the ¼ spacing described.

Figure 7A:
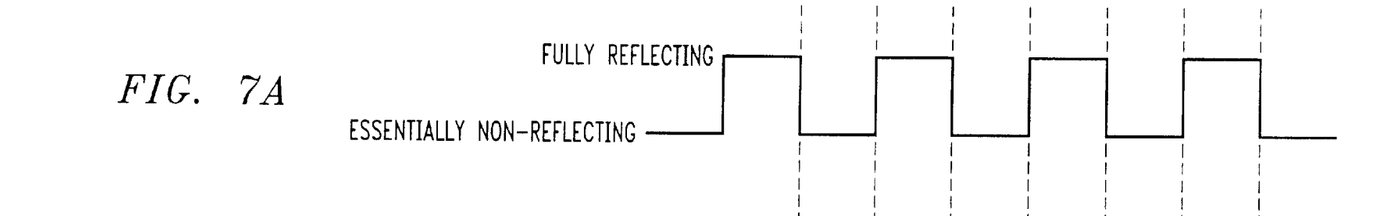
FIG. 7a is a timing diagram of the reflectivity of a first reflecting antenna element shown in FIG. 6.
Figure 7B:
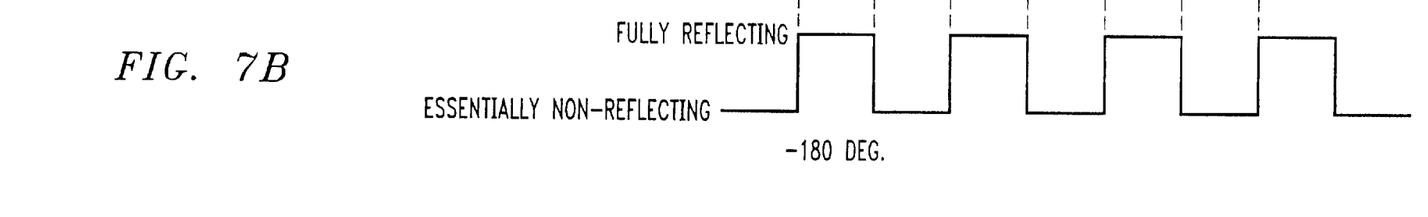
FIG. 7b is a timing diagram of the reflectivity of a second reflecting antenna element shown in FIG. 6.
Figure 7C:
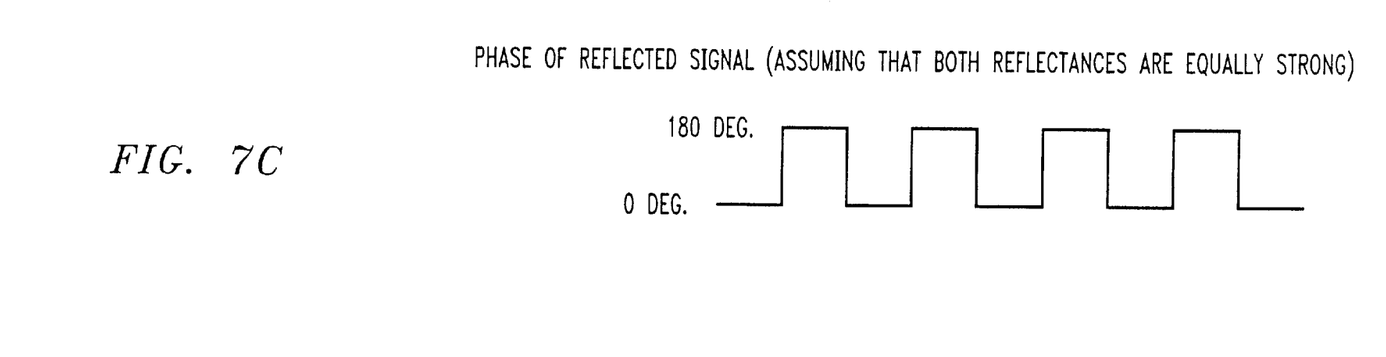
FIG. 7c is a graphical representation of the phase of the reflected signals in accordance with an embodiment of the present invention.

FIG. 7a depicts the reflectance of the first reflecting element 301a and FIG. 7b depicts the reflectance of the second reflecting element 301b. As a result of the alternate pulsing, at any given time one of the two reflecting elements is in a fully reflecting mode and the other is in an essentially non-reflecting mode. A mathematical explanation of the applicability and enhancement of the present invention follows.

Mathematical Analysis for a Single Reflecting Antenna

When a single-reflector RF Tag is in its reflecting state, the reflected signal can be represented as a carrier sinusoid modulating (i.e. multiplying) the Fourier Series of the square wave in FIG. 1:

$$\text{reflected\_signal}_{Single\_reflector} = F(t)\cos(\omega_c t) \quad (1)$$

where, in equation (1), $\omega_c$ is the RF carrier frequency in the sinusoid $\cos(\omega_c t)$ that is modulated (i.e., multiplied) by the Fourier Series $$F(t) = \frac{1}{2} + \frac{2}{\pi}\sin\left(\frac{2\pi t}{T}\right) + \frac{2}{3\pi}\sin\left(\frac{6\pi t}{T}\right) + \frac{2}{5\pi}\sin\left(\frac{10\pi t}{T}\right) + \cdots \quad (2)$$

of a square wave of period T that varies between 0 and 1 (neglecting scaling factors), with 1/T being the frequency of a subcarrier that can be modulated as described elsewhere in this application. The ellipsis ( . . . ) in equation (2) represents the higher-order terms of this series, which is shown for an ideal square wave. The coefficients of the Fourier Series for a less-than-ideal square wave will somewhat deviate from these coefficients to a degree, but such deviations will not change the results of the present analysis.

In the interrogator 103, the reflected signal picked up by the receive antenna 206 and amplified by the low-noise amplifier 207 is demodulated by the mixer 208 using the RF source 214 (homodyne detection). This demodulation eliminates the $\cos(\omega_c t)$ factor from equation (1). Consequently, the only surviving part of equation (1) in the signal presented to the filter-amplifier 210 is the Fourier series F(t).

The filter-amplifier 210 is an AC-coupled lowpass filter that suppresses direct current (DC) frequencies, passes frequencies around the carrier frequency $$\frac{1}{T} \text{ Hz,}$$

and blocks frequencies at and above its second harmonic frequency $$\frac{2}{T} \text{ Hz.}$$

(The use of AC coupling and lowpass filtering is an inexpensive method of constructing a bandpass filter with a passband centered on the carrier frequency.) Consequently, to a first approximation, the only remaining term in the Fourier series F(t) is its fundamental (i.e. its subcarrier) frequency term, which in equation (2) is $$\text{filtered\_signal}_{single\_reflector} = \frac{2}{\pi}\sin\left(\frac{2\pi t}{T}\right) \quad (3)$$

The filtered signal can be further demodulated to extract information that was modulated onto it as described elsewhere.

Mathematical Analysis for Two Reflecting-Antennas

The square wave of reflection for the two-reflector system has twice the amplitude of the single-reflector system, because (i) the RF-Tag is reflecting constantly, and (ii) alternate reflections have a 180° phase difference. The following mathematical analysis shows this for the general case in which the phase angle of the reflections from the second reflecting-element 301b differ from those of first element 301a by φ radians, so that the total signal reflected by both elements is $$\text{reflected\_signal}_{two\_reflector} = F(t)\cos \omega_c t + (1-F(t))(\cos(\omega_c t + \phi)) \quad (4)$$

where F(t) is the Fourier series defined in equation (2). It will be noted that 1−F(t) assumes the same two values (0 for no reflectance and 1 for full reflectance) as F(t) assumes, and also that 1−F(t) is 0 when F(t) is 1, and vice versa. Collecting terms and using the usual trigonometric identity for cos($\omega_c$t+p) produces the equivalent expression $$\text{reflected\_signal}_{two\_reflector} = \cos(\omega c t + \phi) + F(t)((1-\cos(\phi))\cos(\omega c t) + \sin(\phi)\sin(\omega c t)) \quad (5)$$

After the reflected signal is received by the interrogator 103, the signal is demodulated by the mixer 208. This demodulation eliminates carrier-frequency factors such as cos(ωct+φ), with the result that the signal presented to the filter-amplifier 210 can be represented as $$\text{demodulated\_signal}_{\text{two\_reflector}} = 2\left|\sin\left(\frac{\varphi}{2}\right)\right| F(t) \quad (6)$$

(This expression is obtained with the aid of standard trigonometric identities.) As in the single-reflector case, the filter-amplifier 210 eliminates all harmonics except the fundamental (i.e. subcarrier) frequency in the Fourier Series F(t) of equation (2):

$$\text{filtered\_signal}_{\text{two\_reflector}} = \frac{4}{\pi}\left|\sin\left(\frac{\varphi}{2}\right)\right|\sin\left(\frac{2\pi t}{T}\right) \quad (7)$$

If the two reflecting elements are separated by approximately ¼ wavelength $$\left(\text{i.e. by } \frac{\lambda}{4}\right)$$

so that φ=180°, equation (7) reduces to equation (8)

$$\text{filtered\_signal}_{\text{two\_reflector}} = \frac{4}{\pi}\sin\left(\frac{2\pi t}{T}\right) \quad (8)$$

which as in the single-reflector case may be further demodulated to extract an information-bearing signal.

A comparison of equations (3) and (8) reveals that the signal reflected by the two-antenna configuration of FIG. 3b is twice as large as the reflected signal from the single reflector system of the prior art (FIG. 3a). This translates into a 6 dB enhancement or improvement in the signal-to-noise power ratio. Because of the $r^{-4}$ relationship discussed previously, this 6 dB improvement further translates into a 41% increase in the maximum interrogation range.

There is, however, a limitation on this improvement in the signal-to-noise ratio. The 6 dB improvement can be achieved when the two reflecting elements 301a and 301b are spaced approximately ¼ wavelength apart and reflect equally strongly in the direction of reflection. If this is not the case, an improvement that is less than a 6 dB but greater than 0 dB will be achieved provided that the spacing is greater than λ/12 in the direction of the incident signal. If the spacing is less than λ/12 in the direction of the incident signal, the performance is worse than that of the single reflector of the prior art.

This can be shown mathematically by dividing equation (3) into equation (8), giving:

$$\text{ratio}_{two\text{-}reflectors\text{-}to\text{-}one\text{-}reflector} = 2\left|\sin\left(\frac{\varphi}{2}\right)\right| \quad (8)$$

If φ=180°, the ratio is 2 (i.e. 6 dB), as stated previously. Equation (8) shows that two reflectors perform better than one reflector if the phase difference φ is greater than 60°, which corresponds to a separation of approximately $$\frac{\lambda}{12}$$

(λ/12 wavelength) between the reflecting elements. Conversely, two reflectors will perform worse than a single reflector if the phase difference φ is less than 60°.

Figure 8:
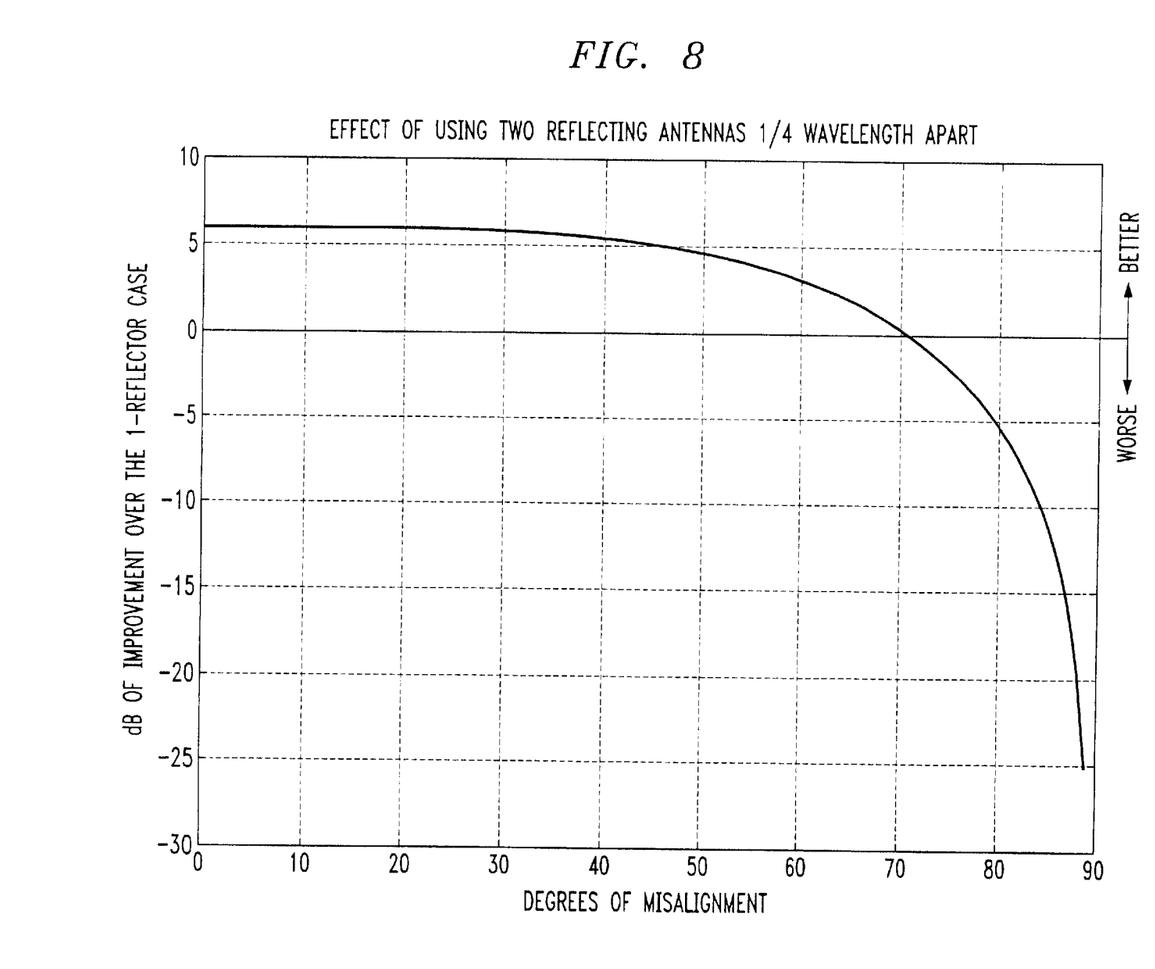
FIG. 8 is a graphical plot showing the signal level improvement provided by the reflecting antenna arrangement of the present invention.

Assuming that the two reflecting elements 105 and 120 are spaced approximately ¼ wavelength apart (i.e. λ/4) so that φ=180° precisely, the graph of FIG. 8 shows the variation in reflected signal as the angle between the axis of the two reflecting elements becomes mis-aligned with the direction of the incoming RF radiation. Specifically, this graph plots 20 $\log_{10}(2 \sin (\frac{1}{2} \cos(\vartheta))$ in dB versus the misalignment angle ϑ in degrees. FIG. 8 implies that the two-reflector configuration is superior to the one-reflector configuration if the misalignment angle ϑ is less than 70°.

On the other hand, there are many situations in which an RF-Tag system can be oriented so that the two reflecting elements are positioned approximately ¼ wavelength apart in the direction of reflection. For example, in a parking meter an RF-Tag can be positioned in a predictable orientation to an interrogation device with a directional antenna mounted in or on a vehicle driven past the parking meter.

When the assumption of the previous paragraph is invalid, there are several strategies for coping with this. The remainder of this application is devoted to these strategies.

Coping with Large Misalignment Angles

The simplest method of coping with a misalignment angle ϑ greater than 70° is simply to pulse both reflecting antenna elements 301a and 301b on and off together simultaneously, so that both are on or off at the same time. This causes the reflections from both elements to add together constructively, with the result that the reflected signal is enhanced from 3.5 dB to 6 dB above the single-reflector prior-art embodiment of FIG. 3a.

A strategy for utilizing this is for both reflecting antenna elements 301a and 301b to pulse first alternately on and off, followed by pulsing both on and off simultaneously for an equally long interval. A message would be modulated onto the subcarrier in duplicate, i.e. once in the first interval, and again in the second interval. If Interrogator 103 receives both copies of the message, it would simply discard the duplicate message.

An alternative strategy is for the Interrogator 103 to pick up the pulsed reflections from the first and second intervals and to identify the interval that generated the strongest reflection. The Interrogator will send a message to the Processor 305 of the RF Tag designating the stronger interval, so that the Processor 305 can use the appropriate mode (i.e. alternating or simultaneous pulsing) to send the message(s) to the Interrogator 103.

Multiple Reflectors

Figure 6B:
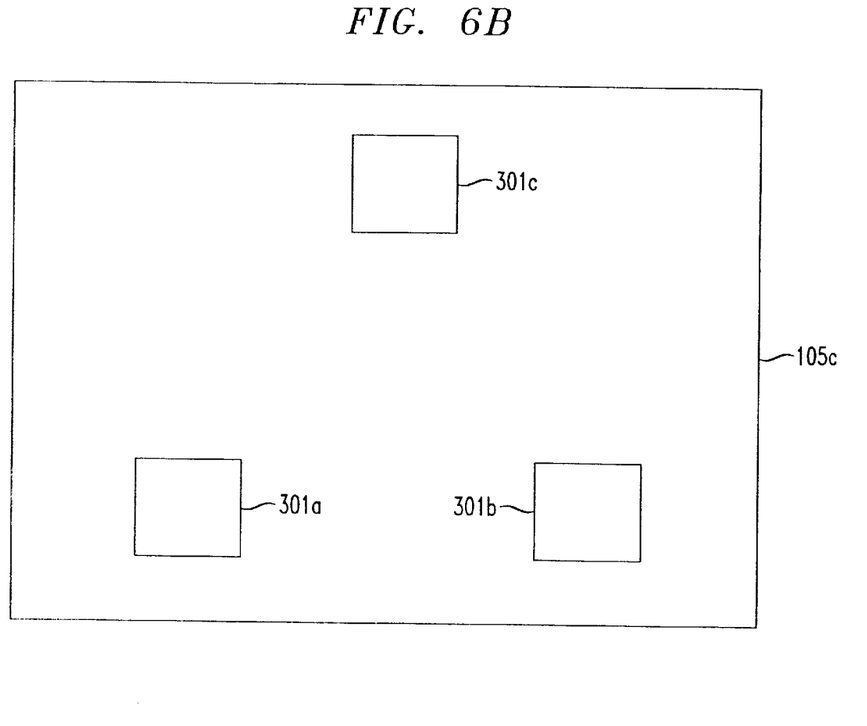
FIG. 6b is a block diagram of an RF Tag containing three reflecting antenna elements according to another embodiment of the present invention.

If the orientation of the axis of the reflecting antenna elements cannot always be aligned with the direction of reflection, multiple reflectors can be used advantageously. For example, a parking-meter reader on foot might approach a parking meter bearing an RF-Tag from many possible different directions. In this case, a planar configuration of reflecting antenna elements on the parking meter will be appropriate provided that the plane is mounted parallel to the ground. FIG. 6b shows a block diagram of RF tag 105c having three reflecting antenna elements 301a, 301b and 301c arranged in a triangular array. In this embodiment, once the RF Tag receives the initial interrogating RF signal, the processor 305 would be pre-programmed to make the three elements 301a, 301b and 301c pulse alternately in pairs—first elements 301a and 301b, then 301b and 301c, and finally 301c and 301a for predetermined intervals of time. If the message to be returned from the RF tag 105c is short enough, the tag will simply send the message three times by modulating the pulses from each of the three pairs. If the Interrogator 103 receives a signal reflected from at least one of the pairs, the Interrogator 103 will demodulate that signal to obtain the message, which can be validated with the aid of an error-detecting code. If the Interrogator 103 receives more than one valid copy of the message, it will discard the duplicate message(s).

If the message to be sent is too lengthy to be transmitted in triplicate, each of the three pairs sequentially will produce a short burst of message-free pulsing. The Interrogator 103 will pick up the pulsed reflections from the three pairs and will identify the pair that generated the strongest reflection. The Interrogator will send a message to the Processor 305 of the RF Tag designating the pair that produced the strongest reflection, so that the Processor 305 can direct that pair to send the message to the Interrogator 103.

Figure 6C:
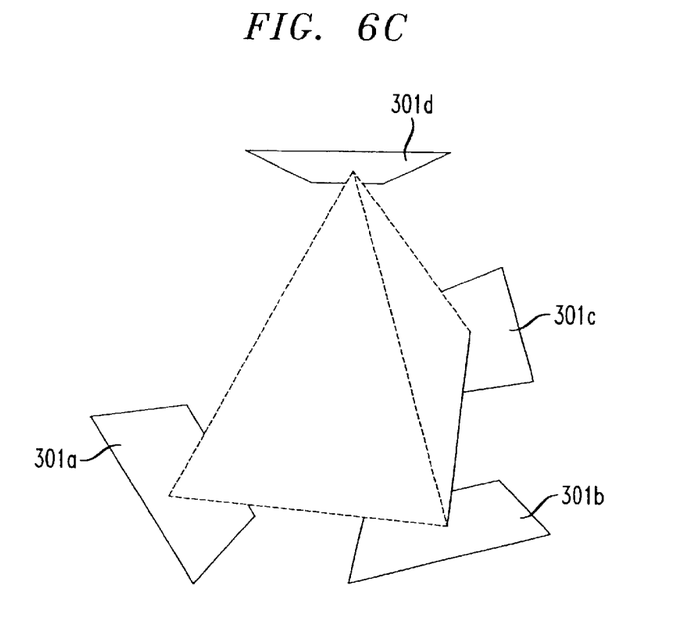
FIG. 6c is a block diagram of an RF Tag containing four reflecting antenna elements according to yet another an embodiment of the present invention.

To deal with situations in which the direction of reflection can be at any angle whatsoever with respect to the RF tag, FIG. 6c shows another embodiment of the present invention utilizing four reflecting antenna elements 301a, 301b, 301c and 301d arranged in a tetrahedral type configuration. (Similar embodiments, such as mounting the reflecting antenna elements flush with the faces of a tetrahedron or other pyramidal structure, can be implemented more conventionally but are not as easy to illustrate.) Similar to the embodiment of FIG. 6b, elements 301a–301d will be alternately pulsed in pairs, and the pair that delivers the strongest reflection will be used by the system. For example, element pairs 301a and 301b, 301b and 301c, 301c and 301d, 301d and 301a, 301a and 301c, and 301b and 301d will be each alternately pulsed for a predetermined time interval. As in the three-element embodiment described above, a short message can be resent in sextuplicate, once by each pair.

If the message is too long for this, each of these six pairs sequentially will produce a short burst of message-free pulsing. After identifying the pair producing the strongest reflection, the Interrogator will send a message to the Processor 305 of the RF Tag designating that pair, so that the Processor 305 can direct that pair to send the message to the Interrogator 103.

Luneberg Lens

A Luneberg lens generalization of the multiple-element approach of the previous section is capable of providing almost perfect resistance to misalignment of the element axis with the direction of reflection. U.S. Pat. No. 3,703,723, titled Portable Passive Reflector, of Victor Albanese et. al. and incorporated herein by reference, describes a Luneberg lens system in which a reflecting net is positioned on one side of a spherical lens (which is sometimes implemented as a hemisphere with a reflecting bottom). The reflectivity of this net is pulsed on and off in a manner similar to the antenna element of a conventional RF Tag. The benefits of using a Luneberg lens include 1) an increase in the SNR by increasing the radar cross-section of the lens, and 2) provision of a very wide range of angles (with respect to the direction of the incoming RF radiation) over which the lens will function.

Methods of fabricating a Luneberg-like lens are described in U.S. Pat. No. 2,866,971 of Kenneth S. Kelleher, also incorporated herein by reference. The lens of the '971 patent is spherical having void dielectric and density correction. The density of the dielectric material forming the spherical lens is changed by reducing the dielectric structure by removal of the dielectric material, thereby leaving voids in the dielectric structure. The spherical lens is assembled by stacking circular plates of the void-containing dielectric material where the plates vary in diameter from a maximum in the middle of the structure toward each end thereof The voids in the dielectric plates are staggered or offset with respect to each other except at the centers of the plates where the voids are aligned to facilitate the passage of an assembly member. The plates are then subject to pressure molding to secure the aligned position.

The Luneberg lens system described by Albanese et al. includes a diode array whose pulsing modulates the effective cross section, and thus the strength of the returned signal. In accordance with the present invention, a second set of reflecting elements can be placed at a radius from the diode array approximately ¼ wavelength greater than the radius of the first set. If the reflectivities of the two shells of reflecting elements are alternately pulsed in accordance with the invention as above, the Luneberg lens system will operate in binary phase-shift key mode (BPSK) mode to provide up to 6 dB of improvement in the SNR. A particular advantage of this so-modified system is its insensitivity to the direction of the incident signal over nearly $2\pi$ steradians of solid angle.

This arrangement in accordance with the present invention may also be applied to the version of the Luneberg lens in which the sphere is bisected and the resulting flat surface is made reflective. In that so-modified version, the Luneberg lens can function over nearly r steradians of solid angle.

Modulation

Many modulation techniques are available for conveying information that the RF-Tag needs to report. Commonly assigned pending U.S. patent application Ser. No. 08/777, 771, filed on Dec. 31, 1996 and incorporated herein by reference, lists a number of modulation schemes, including phase shift keying (ISK) of the subcarrier sin $$\sin\left(\frac{2\pi t}{T}\right).$$

This list includes BPSK, QPSK, and more complex modulation schemes (e.g., MSK, GMSK, etc.) These modulation techniques are generally sufficient for use with an RF Tag system implemented in accordance with the present invention.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for increasing an interrogation range in an RF Tag monitoring system comprising an Interrogator and a first reflecting antenna element and a second reflecting antenna element for receiving RF signals from the Interrogator and reflecting back to the Interrogator modulated signals, wherein the second reflecting antenna element is fixedly positioned and spaced with respect to the first reflecting antenna element along a direction of expected receipt of the RF signals from the Interrogator, the method comprising the step of:

alternately pulsing the first and second reflecting antenna elements on and off such that while the first reflecting antenna element is in a reflecting mode the second reflecting antenna element is in a non-reflecting mode, and when the first reflecting antenna element is in the non-reflecting mode the second reflecting antenna element is in the reflecting mode.

2. The method set forth in claim 1, further comprising providing said first and second reflecting antenna element on one RF Tag.

3. The method set forth in claim 1, wherein said step of alternately pulsing generates a phase difference in a range of 60°–180° between reflected modulated signals from the first and second reflecting antenna elements.

4. The method set forth in claim 1, wherein the RF signals have a wavelength ($\lambda$) and the fixed position and spacing of the second reflecting element is with respect to said first reflecting element comprises a range of $\frac{1}{12}$ to $\frac{1}{4}$ of the wavelength of the RF signals.

5. The method set forth in claim 1, wherein said step of alternately pulsing generates a 180° phase difference between reflected signals from the first and second reflecting antenna elements.

6. The method set forth in claim 1, wherein the RF signals have a wavelength ($\lambda$) and the fixed positioning and spacing between the first and second reflecting antenna elements comprises ¼ wavelength ($\lambda/4$) of the RF interrogating signals.

7. The method set forth in claim 1, wherein the fixed position of the second reflecting antenna element is axially aligned with the first reflecting antenna element.

8. A method for increasing an interrogation range in an RF Tag monitoring system utilizing a Luneberg lens reflector as an RF Tag for receiving and reflecting RF signals, the Luneberg lens having a first and a second set of reflecting elements spaced from a modulating diode array, wherein the second set of reflecting elements is fixedly positioned and spaced with respect to the first set of reflecting elements along a direction of expected incident receipt of the RF signals by the Luneberg lens reflector, the method comprising the step of:

alternately pulsing the first and second sets of reflecting elements on and off such that while the first set of reflecting elements is in a reflecting mode, the second set of reflecting elements is in a non-reflecting mode, and when the first set of reflecting elements is in a non-reflecting mode, the second set of reflecting elements is in a reflecting mode.

9. The method set forth in claim 7, wherein said step of alternately pulsing generates a phase difference between the signals reflected from the first set of reflecting elements and the signals reflected from the second set of reflecting elements.

10. The method set forth in claim 7, wherein the RF signals have a wavelength ($\lambda$) and said fixed spacing of said second set of reflecting elements with respect to said first set of reflecting elements comprises a range of $\frac{1}{12}$ to $\frac{1}{4}$ of the wavelength of the RF signals.

11. The method as set forth in claim 7, wherein the RF signals have a wavelength ($\lambda$) wherein said fixed spacing comprises ¼ wavelength ($\lambda/4$) of the interrogating RF signals.

12. The method set forth in claim 9, wherein said phase difference is in a range of 60° to 180°.

13. The method set forth in claim 9, wherein said phase difference is 180°.

14. An RF Tag communication system, comprising:

an Interrogator for transmitting RF signals;

a first antenna element and a second antenna element for receiving the RF signals from the Interrogator and for reflecting modulated signals back to the Interrogator, said at first and second antenna elements being fixedly spaced from one another along a direction of expected incident receipt of RF signals.

15. The RF Tag communication system in accordance with claim 14, further comprising an RF Tag having said first and second antenna elements disposed therein.

16. The RF Tag communication system in accordance with claim 14, wherein said first and second antenna elements are capable of being alternately pulsed on and off such that while one antenna element is in a reflecting mode, the other antenna element is in a non-reflecting mode and vice versa.

17. The RF Tag communication systems in accordance with claim 14, wherein said RF Tag further comprises a processor coupled to the first and second antenna elements for enabling the alternate pulsing of said first and second antenna elements.

18. The RF Tag communication system in accordance with claim 14, wherein the RF signals have a wavelength ($\lambda$) and said fixed spacing of said at least two reflecting antenna elements with respect to each other comprises a range of $\frac{1}{12}$ to $\frac{1}{4}$ of the wavelength of the RF signals.

19. The RF Tag communication system in accordance with claim 14, wherein said fixed spacing comprises ¼ wavelength ($\lambda/4$) of the RF signals.

20. The RF Tag communication system in accordance with claim 14, wherein said at least two reflecting antenna elements are positioned so as to be axially aligned with each other in the direction of expected incident receipt of the RF interrogating signals.

21. The RF Tag communication system in accordance with claim 16, wherein the alternate pulsing of said at least two reflecting antenna elements generates a predetermined phase difference in a range of 60°–180° between signals reflected by the respective reflecting antenna elements.

22. The RF Tag communication system in accordance with claim 17, wherein said RF signals generated by the Interrogator comprise an initial transmission of information instructing said processor to effect said alternate on-off pulsing of the at least two reflecting antenna elements.

23. The RF Tag communication system in accordance with claim 17, wherein said processor is pre-programmed to alternately pulse said first and second antenna element, and wherein said RF signals generated by the Interrogator comprise an initial transmission to the R-F Tag enabling the activation of the RF Tag.

24. The RF Tag communication system in accordance with claim 21, wherein said phase difference is 180°.

25. An RF Tag communication system, comprising:

an Interrogator for transmitting RF signals;

a first, a second and a third reflecting antenna element for receiving the RF signals from the Interrogator and for reflecting modulated signals back to the Interrogator, and a processor, wherein said first, second and third antenna elements are arranged in a triangular configuration with respect to each other, said Interrogator transmitting an initial RF signal to instruct said processor to alternately pulse said first, second and third reflecting antenna elements on and off in predetermined pairs such that two antenna elements are pulsed on and off for a predetermined interval while the third remains off during the predetermined interval.

26. The RF Tag communication system in accordance with claim 25, further comprising an RF Tag in communication with said Interrogator, said first, second and third reflecting antenna elements being disposed on said RF Tag.

27. The RF Tag communication system in accordance with claim 25, wherein said predetermined pairs comprise said first and second antenna elements, said second and third antenna elements and said third and first antenna elements, and wherein said Interrogator monitors the strength of the reflected signals from said predetermined pairs and instructs said processor to utilize the pair that provides the strongest reflection signal.

28. An RF Tag communication system, comprising:

an Interrogator for transmitting RF signals;

a first, a second, a third and a fourth reflecting antenna element for receiving the RF signals from the Interrogator and for reflecting modulated signals back to the Interrogator, and a processor, wherein said antenna elements are arranged in a tetrahedral configuration, said Interrogator transmitting an initial RF signal to instruct said processor to alternately pulse said reflecting antenna elements on and off in predetermined pairs such that two antenna elements are pulsed on and off for a predetermined interval while the other two elements remain off during the predetermined interval.

29. The RF Tag communication system in accordance with claim 28, further comprising an at least one RF Tag, said first, second, third and fourth reflecting antenna elements being disposed in said at least one RF Tag.

30. The RF Tag communication system in accordance with claim 28, wherein said predetermined pairs comprise said first and second reflecting antenna elements, said second and third antenna elements, said third and fourth antenna elements, and said fourth and first antenna elements, and wherein said Interrogator monitors the strength of the reflected signals from said predetermined pairs and instructs said processor to utilize the pair that provides the strongest reflection signal.

31. A method for increasing an interrogation range in an RF Tag monitoring system comprising an Interrogator and a first reflecting antenna element and a second reflecting antenna element for receiving RF signals from the Interrogator and reflecting back to the Interrogator modulated signals, wherein the second reflecting antenna element is fixedly positioned and spaced with respect to the first reflecting antenna element along a direction of expected receipt of the RF signals from the Interrogator, the method comprising the step of:

alternately pulsing both the first and second reflecting antenna elements on and off together such that both reflecting antenna elements are simultaneously either in the reflecting mode or else in the non-reflecting mode.

* * * * *